United States Patent
King, Jr. et al.

(10) Patent No.: US 7,637,299 B2
(45) Date of Patent: Dec. 29, 2009

(54) CUTTING ELEMENT FOR SEALING MACHINE

(75) Inventors: Francis X. King, Jr., Brookline, NH (US); Jonathan Van, Pelham, NH (US); Mitchell W. Smith, Newton, NH (US); Kenneth Chrisman, Brookline, NH (US)

(73) Assignee: Shanklin Corporation, Ayer, MA (US)

( * ) Notice: Subject to any disclaimer, the term of this patent is extended or adjusted under 35 U.S.C. 154(b) by 538 days.

(21) Appl. No.: 11/176,759

(22) Filed: Jul. 7, 2005

(65) Prior Publication Data

US 2007/0006973 A1 Jan. 11, 2007

(51) Int. Cl.
B32B 38/04 (2006.01)
B29C 65/00 (2006.01)
B32B 37/00 (2006.01)
B32B 38/10 (2006.01)

(52) U.S. Cl. .................. 156/515; 156/251; 156/267; 156/269

(58) Field of Classification Search .............. 156/251, 156/267, 269, 515
See application file for complete search history.

(56) References Cited

U.S. PATENT DOCUMENTS

| | | | |
|---|---|---|---|
| 2,350,930 A | 6/1944 | Salfisberg | |
| 3,597,587 A | 8/1971 | Baum | |
| 3,766,031 A | 10/1973 | Dillon | |
| 4,359,361 A * | 11/1982 | Wright | 156/497 |
| 6,027,596 A | 2/2000 | DeFriese et al. | 156/251 |
| 6,526,728 B1 | 3/2003 | Sorenson et al. | 53/450 |
| 2002/0052619 A1 | 5/2002 | Transue | |
| 2003/0046905 A1 | 3/2003 | Kaechele et al. | 53/459 |
| 2004/0133989 A1 | 7/2004 | Lombardi et al. | |
| 2005/0047687 A1 | 3/2005 | Friedman | |
| 2005/0089706 A1 | 4/2005 | Urata et al. | |

OTHER PUBLICATIONS

The International WIPO Communication dated Jan. 17, 2008.
International Search report dated Aug. 10, 2007.
The Taiwanese Communication dated Aug. 18, 2008.
Taiwanese Communication dated Jul. 16, 2009.

* cited by examiner

*Primary Examiner*—Philip C Tucker
*Assistant Examiner*—Michael N Orlando
(74) *Attorney, Agent, or Firm*—Nields, Lemack & Frame, LLC

(57) ABSTRACT

The present invention describes a blade assembly for use with side-sealing and lap-sealing machines, which are used to seal thermoplastic film. Briefly, the cutting element is oval in shape, and has its entire outer edge profiled. This provides four distinct cutting surfaces, depending on the mounting orientation of the cutting element in the machine. This cutting element is held against a heating block, and its temperature is continuously monitored by a temperature sensor. The sensor is spring-loaded to insure solid contact with the cutting element, and thus, accurate temperature measurements. This entire assembly is then encased in insulation. Additionally, the cutting element is mounted on an adjustable platform, which permits vertical adjustments relative to the film. Thus, the specific portion of the cutting element which actually engages the film can be adjusted to improve the cutting quality or further extend the useful life of the cutting element.

17 Claims, 5 Drawing Sheets

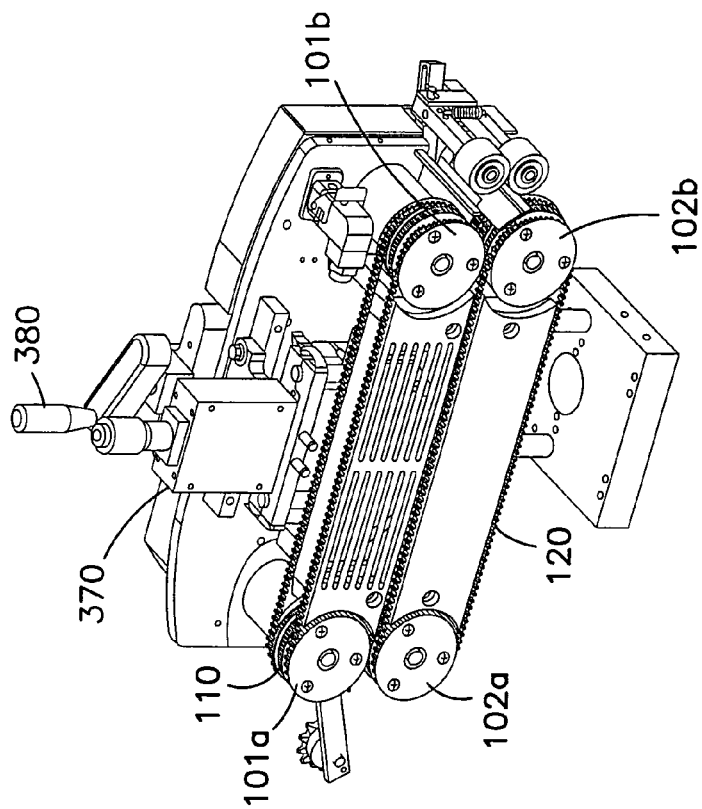
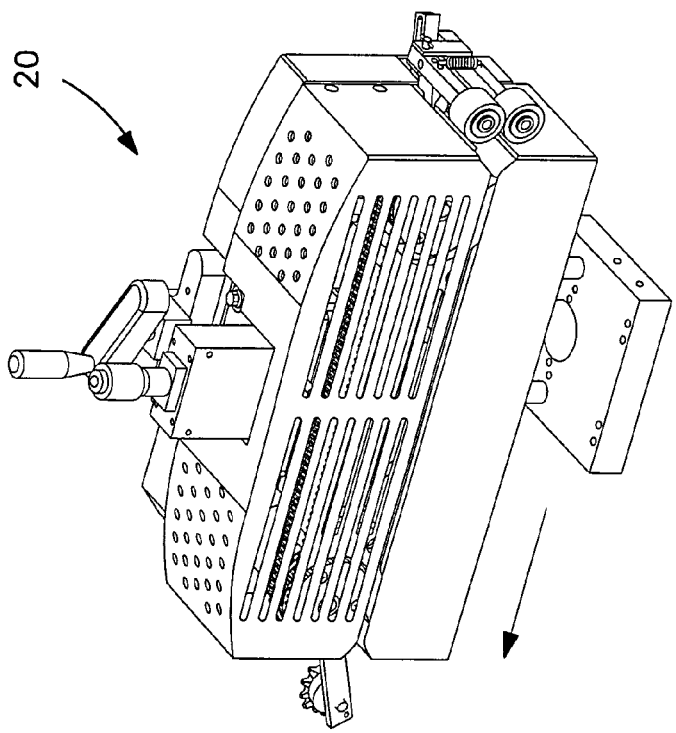
FIG. 2

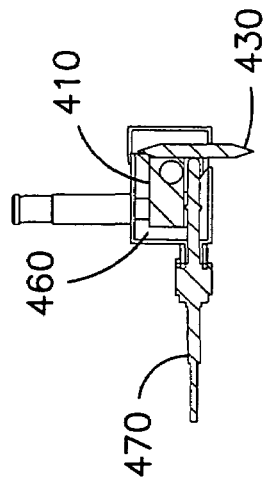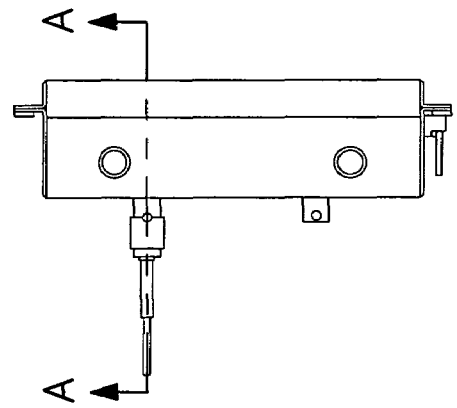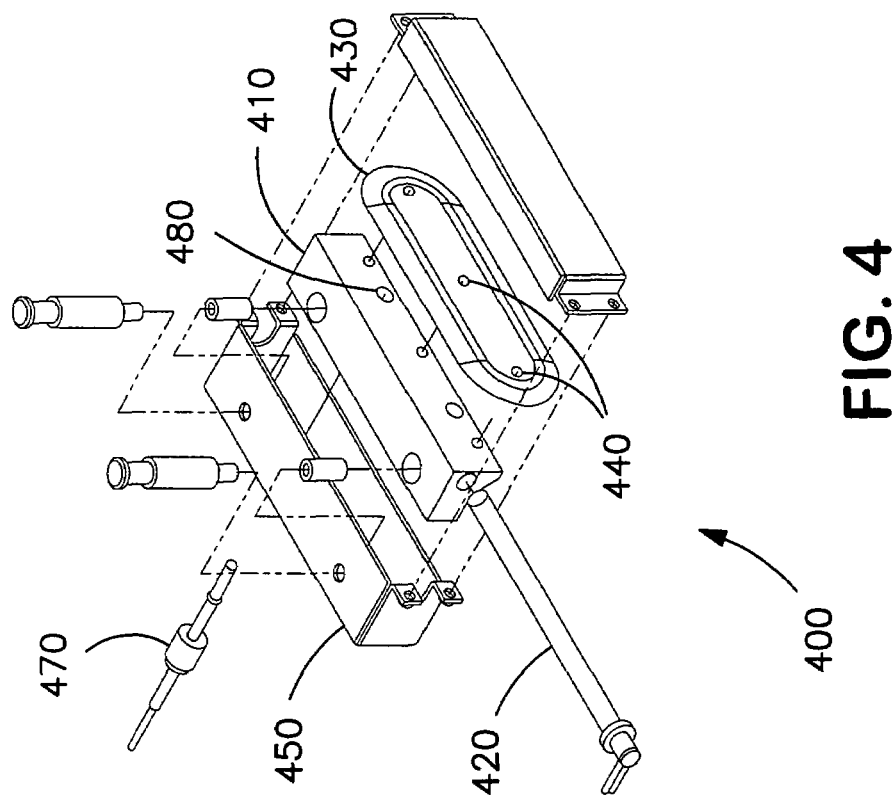

CUTTING ELEMENT FOR SEALING MACHINE

BACKGROUND OF THE INVENTION

Machines used to wrap and seal articles and packages in thermoplastic film are well known in the art. Two types of machines are commonly referred to as side-sealing and lap-sealing machines. In the typical side-sealing configuration, an article or set of articles travels, typically via a conveyer belt, toward the machine. A sheet of center-folded plastic film, having two layers, is fed from a direction which is preferably perpendicular to the direction of the conveyer. The two layers of the film are then separated such that the article is placed between the lower layer and the upper layer. On one side of the article is the center-fold, while on the other side, there is an open edge where the two layers are not attached. The machine has a side sealing mechanism, which typically comprises several sets of belts to hold and guide the film, a heating/sealing element that fuses or welds the two layers together and a cutting element that removes the excess material. Thus, as the article passes by the side sealing mechanism, this open edge is sealed by welding the two layers together, the plastic is cut and the waste is removed and discarded. At this point, the plastic film resembles a tube, with openings at both the leading and trailing ends of the article, but sealed along both sides. As the article continues to advance, an end sealing mechanism is then employed to seal the film at the leading end of the article. The article is then advanced and the end sealing mechanism then seals the film at the trailing end of the article.

Incomplete, inconsistent or sloppy welds can be problematic with these types of machines. One specific issue is caused by the temperature and sharpness of the cutting element. If the temperature is too low, or the cutting surface becomes dull, the ability to create a high quality seal is reduced. Thus, to maintain a satisfactory output, it is necessary to replace the cutting element when it wears. In machines of the prior art, the cutting element is typically a single blade, typically with a cutting surface having a radius. Once this blade wears or becomes covered with film, it must be replaced. Replacement of the cutting element requires removal of the used blade and the insertion of a new blade.

The cost associated with replacement blades can be significant. Also, it is imperative that a supply of replacement blades be available, since the sealing machine is completely inoperative without a blade.

SUMMARY OF THE INVENTION

The problems associated with the prior art have been overcome by the present invention, which describes a blade assembly for use with sealing machines, which are used to seal thermoplastic film. Briefly, the cutting element is oval in shape, and has its entire outer edge profiled. This provides four distinct cutting surfaces, depending on the mounting orientation of the cutting element in the machine. This permits the cutting element to have roughly four times the useful life of conventional blades. This cutting element is held against a heating block, and its temperature is continuously monitored by a temperature sensor. This sensor measures the actual temperature of the cutting element, as opposed to that of the heating block. The sensor is spring-loaded to insure solid contact with the cutting element, and thus, accurate temperature measurements. This entire assembly is then encased in insulation. Additionally, the cutting element is mounted on an adjustable platform, which permits vertical adjustments of the cutting element relative to the film. Thus, the specific portion of the cutting element which actually engages the film can be adjusted to improve the cutting quality or further extend the useful life of the cutting element. To further simplify the replacement process, the entire heater block assembly can be removed and replaced without the use of any tools.

BRIEF DESCRIPTION OF THE DRAWINGS

FIG. 2 illustrates the side-sealing mechanism in accordance with the present invention;

FIG. 4 illustrates an exploded view of the cutting element and associated heater block assembly;

FIG. 4a is a top view of the heater block assembly;

FIG. 4b is a cross-section of the heater block assembly at line A-A shown in FIG. 4b.

DETAILED DESCRIPTION OF THE INVENTION

Figure 1:
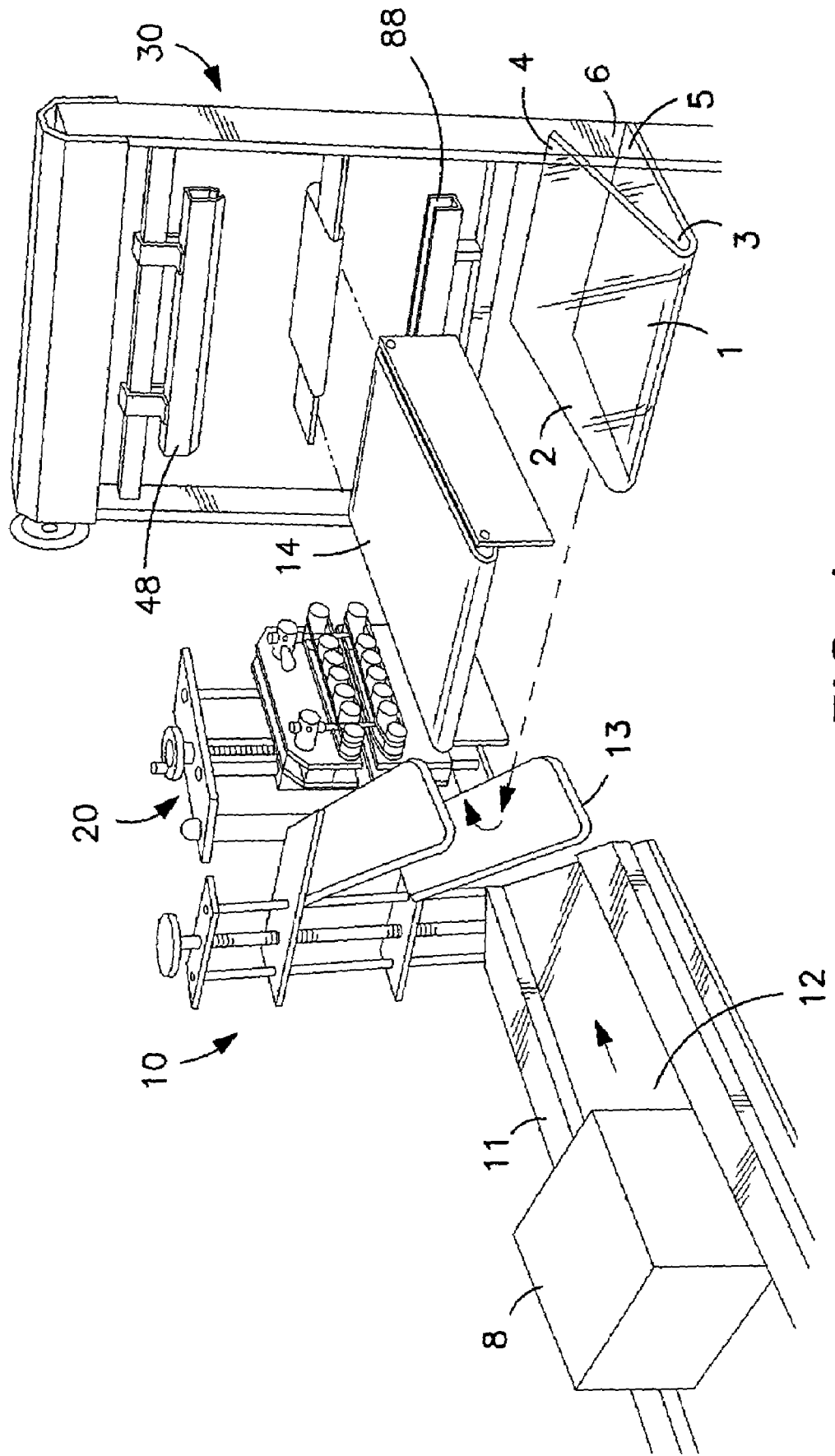
FIG. 1 illustrates a representative side-sealing machine of the prior art.

FIG. 1 illustrates a representative side-sealing machine used to encapsulate or wrap an article in thermoplastic film, as described in U.S. Pat. No. 6,526,728. The machine 10 utilizes a conveyer belt 12 operating at a relatively constant speed to deliver articles 8 that are to be encapsulated. The thermoplastic film 1 is center-folded, such that the side with the fold is closed, while the opposite side 6 is open. On this opposite side, there are two layers of film 4,5, which will later be sealed. This center-folded thermoplastic film 1 is fed from a reel (not shown) that is preferably mounted perpendicular to the direction of travel of the conveyer belt 12. The film is then inverted and separated by an inverter 13 such that the article is enveloped between the two layers 4,5. At this point, the film 1 on one side of the article is closed, while the opposite side 6 remains open. Also, the film at both the leading and trailing ends of the article are not sealed. Downstream from the inverter is the side-sealing mechanism 20. After proper relative positioning of the article between the layers of the film 4,5, the enveloped article approaches the side-sealing mechanism 20.

The side-sealing mechanism 20 is located on the open side 6 of the enveloped article. The mechanism holds the two layers of film 4,5 together, and guides the layers through the heating and cutting means. It then welds the two layers together, and cuts off the surplus material. The surplus material is pulled away so as not to reattach to the film while it is still at an elevated temperature.

As shown in FIG. 2, to perform these actions, the mechanism 20 preferably comprises two sets of cooperating pulleys, an upper set 101 and a lower set 102. These sets work in unison to pull the two layers of film into the mechanism and hold the layers in place. In the preferred embodiment, each of the pulleys has teeth 110 in its channel so as to accept one or more, preferably two, timing belts 120. The presence of teeth 110 ensures that the timing belt does not slip relative to the pulleys; a common problem with the prior art. However, V belts can also be utilized with this invention, as well. The first set of pulleys 101 is located above the layers of film, while the second set 102 is located below the layers. Each set comprises a drive pulley 101a, 102a and a tail pulley 101b, 102b. There may optionally be one or more idler pulleys (not shown).

Each of these pulleys also has one or more, preferably two, O-rings mounted in the channel where the belts are located, so as to provide individual channels for each of the timing belts.

Each of the timing belts preferably has a special gripping outer surface, that is bonded to a truly endless steel or Kevlar reinforced timing belt. Each corresponding set of belts has upper and lower pressure plates that are preset to insure good contact between the pair of belts.

Figure 3:
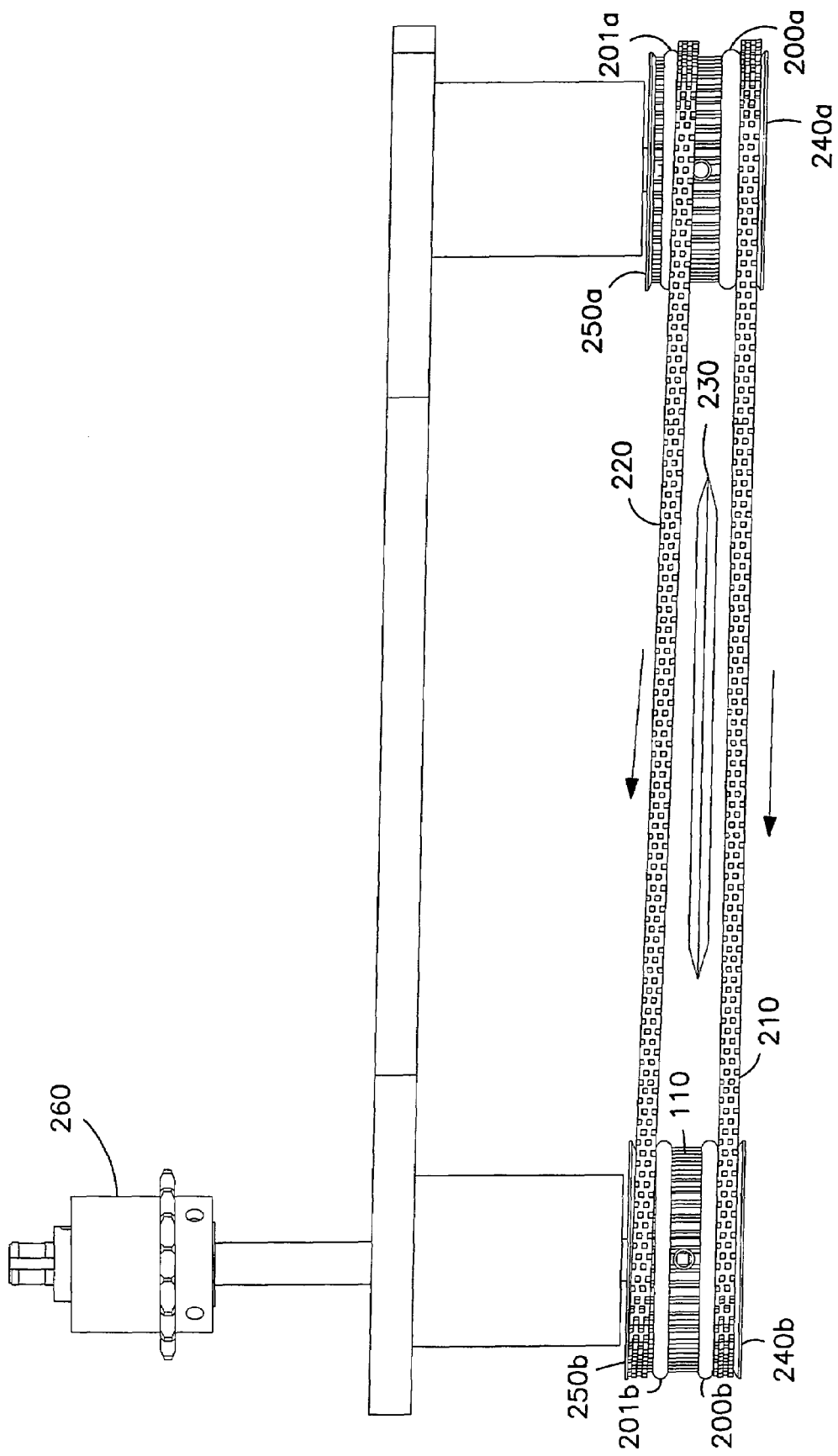
FIG. 3 illustrates a top view of the side-sealing mechanism shown in FIG. 2.

In the preferred embodiment, as shown in FIG. 3, one set of O-rings 200 is positioned such that the movement of the outermost belt 210 is made to be parallel to the direction of the film movement. The outer wall of the pulley 240 and this first set of O-rings 200 provide the guides for the outermost belt 210. As shown in FIG. 3, O-ring 200a and O-ring 200b are equidistant from the outer wall of their respective pulleys. A second set of O-rings 201 is used to guide the innermost belt 220 in a path that diverges away from the direction of the film and the outermost belt. This can be accomplished in a number of ways. For example, a combination of one O-ring and the inner wall of the downstream pulley 250b can be used to define the channel for the innermost belt 220, as shown in FIG. 3. Similarly, two O-rings may be inserted on the upstream pulley to define a channel for the innermost belt. Alternatively, a single O-ring 201a, as shown in FIG. 3, can be used to define the inner wall of the channel for the innermost belt 220. Because of the divergence angle, there are no forces pushing the innermost belt 220 toward the outermost belt 210, thus the second O-ring may be eliminated. In other words, in the channel associated with the upstream pulley 240a, the O-ring 201a provides the inner guide for the belt 220. In the channel associated with the downstream pulley 240b, the O-ring 201b provides the outer guide for the belt 220. As a result, the innermost belt 220 is closest to the outermost belt 210 at the upstream pulley, and farthest away from it at the downstream pulley. The cutting element 230 is preferably located between the upstream and downstream pulleys. Thus, as the film passes the upstream pulley, it is still intact; however, it is cut before it reaches the downstream pulley. By introducing this divergence angle, the innermost belt 220 helps guide the unwanted surplus away from the film after it is cut. In the preferred embodiment, the innermost belt 220 is guided in the channel of the downstream pulley a distance further away from the film than on the upstream pulley sufficient to force the surplus plastic away from the film. One such suitable distance is about ¼ inch. This ensures that the surplus material does not reattach itself to the film while still at an elevated temperature. This surplus material is then held under tension and fed into a reel, which is later discarded. While the use of multiple belts, with a divergence between them is preferred, the use of a single belt, or multiple parallel belts is also within the scope of the present invention.

As shown in FIG. 4, the heater block assembly 400 comprises a heater block 410, which preferably contains a cartridge style heater 420. This heater block 410 is constructed of a heat conductive material, preferably copper. The cutting element 430 is mounted to the heater block 410, allowing it to be in good thermal contact with the heater block 140 so that it may be heated directly by the heater block 410. In the preferred embodiment, the cutting element 430 is oval shaped, with the mounting holes 440 positioned such that it can be installed in any of four possible mounting orientations. The cutting element is preferably roughly 6 inches long and 2-3 inches high. To produce a satisfactory seal, the cutting element is preferably maintained at a temperature between 400° and 800° F. The speed at which the film passes the cutting element is useful in determining the optimal temperature of the cutting element. For example, as the film speed increases, the optimal temperature of the cutting element increases as well. The heater block 410 and cutting element 430 are encased in an insulating block 450 such that only the lower portion of the cutting element 430 is exposed. The insulating block 450 is used to envelope the heater block 410 and cutting element 430 so as to concentrate and localize the heat. In the preferred embodiment, a refractory material such as a ceramic fiber paper, most preferably FiberFrax®, is used as the insulating material 460, although other insulators are within the scope of the invention. Fiberfrax® is a ceramic fiber paper, having a heat flow rate of 0.57 BTU/hr×in/sq. ft @800° F. and a temperature range of −425° F. to 2300° F. Another insulating material, Alumina Silica Board, has a heat flow rate of 0.85 BTU/hr×in/sq. ft @800° F. and a temperature range of 0° F. to 2192° F., and is also suitable for this application.

A temperature sensing probe 470 is used to monitor the temperature of the cutting element 430. In the preferred embodiment, a hole 480 is bored through the heater block 410, and the probe 470 is placed within this hole 480. To ensure satisfactory contact between the probe 470 and the cutting element 430, the probe is preferably spring loaded, such that it is biased toward the cutting element 430. The temperature of the cutting element 430 can thus be monitored and the energy supplied to the heater block 410 can be adjusted in response to the monitored temperature. By measuring the temperature of the cutting element 430 directly, the thermal lag and uncertainty associated with monitoring the temperature of the heater block 410 is eliminated.

In one embodiment, the cutting element 430 and heater block 410 are constructed from copper to maximize the conductivity between the two elements. In this embodiment, the copper cutting element 430 is highly polished and then coated so as to prevent film buildup. Compositions such as, but not limited to, titanium nitride, and Nedox® from General Magnaplate Corporation can be used to provide this coating. Nedox® coatings are created by the controlled infusion of various polymers within a proprietary nickel alloy plating. It has a frictional coefficient of 0.09 and a temperature range of −250° F. to 550° F. A Nedox® coating will survive temperatures of 1400° F., but all lubricant will dissipate above 800° F. In a second embodiment, the cutting element 430 is constructed with highly polished aluminum with a hard anodized coating with TFE or other similar temperature release coating infused into the anodized coating. Alternatively, aluminum oxide coatings such as Tufram® from General Magnaplate Corporation can be used to coat the polished aluminum blade. Tufram® has a frictional coefficient of 0.05 and a temperature range of −360° F. to 800° F.

As described above, the temperature probe 470, cutting element 430, heater block 410 and insulating box 450 comprise the heater block assembly 400. This heater block assembly 400 is mounted to a retractable platform, such that it can be moved away from the film when the machine has stopped. In the preferred embodiment, the blade assembly 400 is mounted to an adjustable platform 370, as shown in FIG. 2. This adjustable platform 370 preferably comprises an air cylinder with guide rods and a manually adjustable stroke-limiting device 380. Alternatively, the adjustable platform can be a basic motor, a servo motor or stepper motor, or can be pneumatically or hydraulically controlled. The adjustable stroke enables the operator to reposition the blade with respect to the film during sealing, thereby changing the portion of the blade in contact with the film. By repositioning the blade, the operator can improve the seal quality, which can be degraded by film build-up or contamination of the portion of the blade in contact with the film. This technique can be used several times on each of the four sealing edges of the blade, thus greatly extending the life of the blade.

In another embodiment, a control system (not shown) is used to control the movement of the adjustable platform. For example, a control system actuates a stepper motor, which in turn causes the blade to be dynamically repositioned with respect to the film. The blade is continuously moved upward and downward such that the entire useable portion of the blade is equally exposed to the film. This technique maximizes the useful life of the blade without any intervention by the operator. This embodiment is applicable to all kinds of motors and is not limited to stepper motors.

Figure 5:
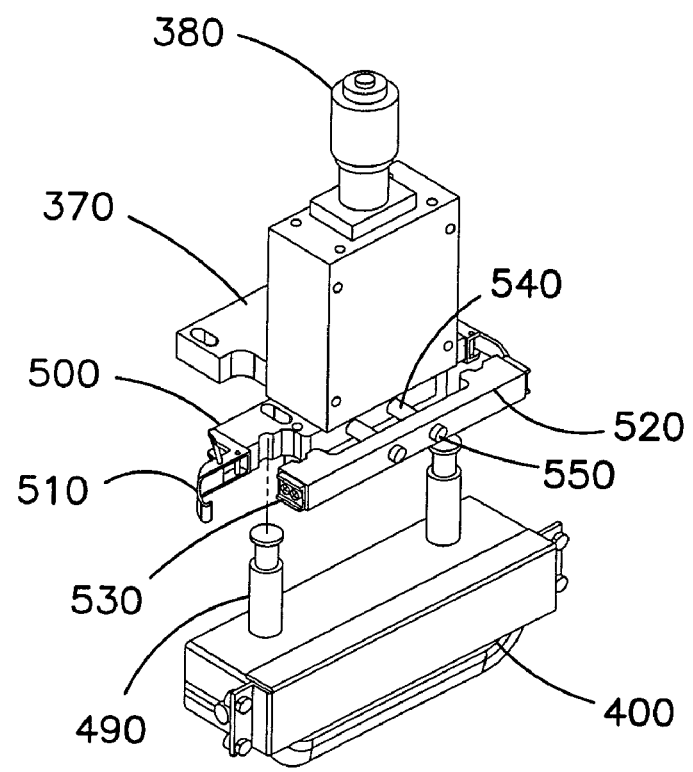
FIG. 5 illustrates a perspective view of the heater block assembly and the adjustable platform.

In the preferred embodiment shown in FIG. 5, heater block assembly 400 is secured to the adjustable platform 370 without the use of any tools. Mounted to the top side of heater block assembly 400 are several, preferably two, mounting pins 490. Mounted to the underside of the adjustable platform 370 is a mounting plate 500. This mounting plate 500 preferably has latches 510 on each end, which are adapted to hold a clamping plate 520. The clamping plate 520 has latch keepers 530, adapted to interact with the latches 510 on the mounting plate 500. Each of these plates has an incomplete hole, formed such that when the plates are latched together, there are several, preferably two, mounting holes formed, which hold the mounting pins 490. The mounting pins 490 are designed such that the diameter at the free end is greater than that of the shaft. The mounting holes formed by the assembly of mounting plate 500 and clamping plate 520 have a diameter which is roughly equal to that of the shaft of the mounting pins 490, but less than the diameter at the free end of the mounting pins 490. Thus, to install the heater block assembly 400, the mounting pins 490 are positioned in the incomplete holes of the mounting plate 500. The clamping plate 520 is then drawn to the mounting plate 500 using latches 510. This mating completes the formation of the mounting holes and these holes surround the mounting pins 490, thereby holding the heater block assembly 400 in place. To further simplify the assembly and disassembly of the clamping plate 520, one or more, preferably two alignment pins 540 can be used. These pins 540 extend from the edge of the mounting plate to which the clamping plate is mated. The clamping plate 520 has corresponding guide holes 550, through which the alignment pins 540 pass. In the preferred embodiment, the alignment pins 540 are ¼" diameter and extend one inch from the mounting plate 500. The free ends of the alignment pins preferably have retaining rings which serve to keep the mounting plate 500 and clamping plate 520 attached.

To replace the existing heater block assembly 400, the user simply unlatches the mounting plate 500 from the clamping plate 520. This action will release the heater block assembly. A new assembly can be installed by placing the mounting pins 490 in the incomplete holes of the mounting plate 500. The clamping plate 520 is then aligned via the aligning pins 540. The latches are then engaged, thereby securing the new heater block assembly in place.

Returning to FIG. 1, after the article passes the side-sealing mechanism 20, it encounters a second heating element 48. This element 48 is used to seal and cut the leading and trailing edges of the film surrounding the article. When the article 8 is properly positioned, the second heating element 48 descends so as to contact the thermoplastic film. This serves to weld the layers together. The film is then cut, preferably in the middle of the newly created seal. The article is then advanced so as to position the trailing edge of the article under the second heating element 48. This process is then repeated, thereby completely sealing the article in thermoplastic film.

What is claimed:

1. A blade assembly attached to a sealing machine adapted to heat, cut and seal thermoplastic film in a sealing machine comprising:
    a heat source;
    an oval shaped metallic member in thermal contact with said heat source and having an outer perimeter, said outer perimeter comprising a plurality of distinct coplanar cutting surfaces effective for cutting said thermoplastic film, said metallic member being positionable on said assembly in a plurality of distinct orientations, such that in each said orientation, a portion of one of said cutting surfaces is positioned to contact said film based upon the orientation of the blade within the assembly.

2. The blade assembly of claim 1, further comprising a temperature sensor in thermal contact with said metallic member.

3. The blade assembly of claim 2, wherein said heat source comprises a heater block having an aperture, and wherein said temperature sensor is positioned in said aperture so as to contact said metallic member.

4. The blade assembly of claim 1, further comprising a vertically adjustable platform on which said metallic member is mounted, whereby adjustments to the height of said platform change the portion of the cutting surface in contact with said film.

5. The blade assembly of claim 1, further comprising an enclosure, within which said heat source and said metallic member are contained.

6. The blade assembly of claim 5, further comprising an insulating material located within said enclosure, positioned between said enclosure and said heat source.

7. The blade assembly of claim 6, wherein said insulating material has a heat flow rate of less than 1 BTU/hr×in/sq. ft., measured at 800° F.

8. The blade assembly of claim 1, wherein said metallic member is polished.

9. The blade assembly of claim 1, wherein said plurality comprises four cutting surfaces.

10. A blade assembly attached to a sealing machine adapted to heat, cut and seal thermoplastic film in a sealing machine comprising:
    a heat source;
    an oval shaped metallic member in thermal contact with said heat source and having an outer perimeter, said outer perimeter comprising a plurality of distinct cutting surfaces effective for cutting said thermoplastic film and a plurality of non-cutting surfaces, each said distinct cutting surface being spaced from another distinct cutting surface by one of said plurality of non-cutting surfaces; said metallic member being positionable on said assembly in a plurality of distinct orientations, such that in each said orientation, a portion of one of said cutting surfaces is positioned to contact said film based upon the orientation of the blade within the assembly.

11. The blade assembly of claim 10, further comprising a temperature sensor in thermal contact with said metallic member.

12. The blade assembly of claim 10, wherein said heat source comprises a heater block having an aperture, and wherein said temperature sensor is positioned in said aperture so as to contact said metallic member.

13. The blade assembly of claim 10, further comprising a vertically adjustable platform on which said metallic member is mounted, whereby adjustments to the height of said platform change the portion of the cutting surface in contact with said film.

14. The blade assembly of claim 10, further comprising an enclosure, within which said heat source and said metallic member are contained.

15. The blade assembly of claim 10, further comprising an insulating material located within said enclosure, positioned between said enclosure and said heat source.

16. The blade assembly of claim 10, wherein said insulating material has a heat flow rate of less than 1 BTU/hr×in/sq. ft., measured at 800° F.

17. The blade assembly of claim 10, wherein said metallic member is polished.

* * * * *

UNITED STATES PATENT AND TRADEMARK OFFICE
CERTIFICATE OF CORRECTION

PATENT NO.       : 7,637,299 B2                                      Page 1 of 1
APPLICATION NO. : 11/176759
DATED            : December 29, 2009
INVENTOR(S)      : King, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 894 days.

Signed and Sealed this

Ninth Day of November, 2010

David J. Kappos
*Director of the United States Patent and Trademark Office*